United States Patent [19]

Yamamura

[11] Patent Number: 5,463,481
[45] Date of Patent: Oct. 31, 1995

[54] LIQUID CRYSTAL DISPLAY HAVING LIQUID CRYSTAL LAYERS ALTERNATELY STACKED WITH INSULATING LAYERS WITH A THICKNESS OF AT MOST 5 MICRONS

[75] Inventor: Nobuyuki Yamamura, Kyungki, Rep. of Korea

[73] Assignee: Samsung Electronics Co., Ltd., Suwon, Rep. of Korea

[21] Appl. No.: 58,712

[22] Filed: May 10, 1993

[30] Foreign Application Priority Data

May 8, 1992 [JP] Japan .................................. 4-116146

[51] Int. Cl.$^6$ ........................ G02F 1/1333; G02F 1/1335
[52] U.S. Cl. .................... 359/53; 359/79; 359/68
[58] Field of Search ................... 359/53, 62, 79, 359/81, 51, 68

[56] References Cited

U.S. PATENT DOCUMENTS

| | | | |
|---|---|---|---|
| 3,886,014 | 5/1975 | Bayer | 156/145 |
| 4,581,608 | 4/1986 | Aftergut et al. | 340/704 |
| 4,659,182 | 4/1987 | Aizawa | 350/339 |
| 4,813,770 | 3/1989 | Clerc et al. | 350/347 |
| 4,878,741 | 11/1989 | Fergason | 350/339 |
| 4,886,343 | 12/1989 | Johnson | 350/335 |
| 5,113,272 | 5/1992 | Reamey | 359/53 |
| 5,221,978 | 6/1993 | Heynderickx et al. | 359/53 |
| 5,248,576 | 9/1993 | Yokoyama et al. | 430/7 |
| 5,276,538 | 1/1994 | Monji et al. | 359/40 |

FOREIGN PATENT DOCUMENTS 57-196214  12/1982  Japan ........................... 359/53

Primary Examiner—Anita Pellman Gross
Assistant Examiner—Charles Miller
Attorney, Agent, or Firm—Charles R. Donohoe; Stephen R. Whitt

[57] ABSTRACT

An LCD having quick response time and sharp contrast provides for a dense white display when using a reflective-type LCD and the desired color density when using a backlight. This LCD is made up of a plurality of field-effect type liquid crystal layers alternately stacked with light-transmitting electrically insulating material layers. The thickness of each liquid crystal layer is desirably less than 3 µm, and that of each electrically insulating material layer is desirably less than 5 µm. The electrically insulating material employs a semiconductor, a metal oxide, or a light-transmitting electrically insulating resin including epoxy resin and acryl resin. The field-effect type LCD is desirably a nematic, phase-transition or ferroelectric type LCD. The total thickness of the LCD is desirably more than 1 µm. A manufacturing method of the LCD and a display apparatus using the LCD are also provided, for use in large-screen display, televisions, personal computers, timepieces or pocket calculator screens.

19 Claims, 8 Drawing Sheets

LIQUID CRYSTAL DISPLAY HAVING LIQUID CRYSTAL LAYERS ALTERNATELY STACKED WITH INSULATING LAYERS WITH A THICKNESS OF AT MOST 5 MICRONS

BACKGROUND OF THE INVENTION

1. Field of the Invention

The present invention relates to a liquid crystal display (LCD) used in optical displays, and more particularly to an LCD to be used in temporary storage devices such as television and computer screens, large-screen displays, timepieces, electronic calculators, soft-printing screens, etc., and the method of manufacturing the LCD.

2. Description of the Related Art

One type of current LCD uses a simple X-Y matrix or thin-film transistor driving method, both of which use twisted nematic (TN) or super twisted nematic (STN) liquid crystal. A polarizer must be used with the TN or STN liquid crystal. Polarizers used with the LCDs absorb over 50% of the incident light. Therefore, the LCDs in a display with a polarizer must generate over 50% more light than LCDs in a display without a polarizer for both LCDs to supply the same amount of light to a user. Consequently, a display using current LCDs consumes a lot of power to produce sufficient light to a user.

The structure of LCDs using the X-Y matrix or thin-film transistor driving methods is generally sealed by interposing liquid crystal between two glass plates. An overall uniform cell gap between the glass plates is necessary. Enlargement of such an LCD is difficult due to the limited precision of plate glass manufacturing.

Accordingly, a technique must be developed to form an LCD without a polarizer on a single substrate using a pattern forming technique, in order to increase the efficiency of the light emitted from the LCD. Such an LCD would have better contrast and allow enlargement of the LCD.

Examples of LCDs without a polarizer include a cholesteric nematic transition (CNT) type (which uses a phase transition effect) and a dynamic scattering mode (DSM) type liquid crystal. Liquid crystal is sealed between two glass plates in the CNT type LCD. The DSM type LCD has a slow response time and cannot be thinly formed so it is no longer commonly used.

An example of an LCD formed on one substrate is a polymer-dispersed liquid crystal (PDLC) type. The PDLC type LCD is arranged more densely due to the single substrate formation. In order to obtain a picture having a desired contrast ratio, the PDLC is made of a polymer material more than half of whose volume is light-transmitting. Scattered light is used to form characters or objects observed by a user. However, sufficient light scattering by the liquid crystal layer must be induced to ensure enough scattering of light for the user to notice the scattered and reflected light (i.e. the displayed characters). The shielding of rearwardly incident light must be enhanced also. To attain these requirements, the thickness of the liquid crystal layer should be at least 20 μm which makes its response time very slow (more than 1 ems).

Still other examples include an LCD for multi-purpose usage in which glass plates are inserted between liquid crystal layers. The objective of the multi-purpose LCD is not to improve the efficiency or contrast of light use. There is a two-story type STN display for compensating polarization, but it is only a background color compensator (using the interference of light).

Even though paper white displays are available, it has not yet been recognized that in a conventional LCD, a large amount of LCD layer front-scattering (transmission) greatly diminishes contrast (specifically, faint whiteness). Thus, LCD's have, in the past, used light with poor efficiency.

SUMMARY OF THE INVENTION

An object of the present invention is to provide an LCD with fast response time and sharp contrast. A further object of the present invention is a manufacturing method and a display apparatus using the LCD having fast response time and sharp contrast.

Another object of the present invention is to provide a reflective-type LCD which clearly displays adequate whiteness density. A further object of the present invention is a manufacturing method and a display apparatus using the LCD which clearly displays adequate whiteness density.

It is another object of the present invention to decrease LCD layer front-scattering without increasing the driving voltage, which is related to improved response time.

A further object of the present invention is to provide a backlight-type (transmittive-type) LCD using a backlight source. A manufacturing method and display apparatus using the LCD with a backlight source which clearly displays adequate color density is another object of the present invention.

An LCD achieving the above objectives generally has a stack of a plurality of field-effect liquid crystal layers alternately stacked with layers of light-transmitting electrically insulating material. The stack is positioned between a light emitting electrode and a lower electrode. The lower electrode is positioned on a substrate which shields light in a first embodiment (reflective-type LCD). The thickness of each liquid crystal layer is less than or equal to 3 μm. The thickness of each layer of the electrically insulating material is preferably less than or equal to 5 μm. The electrically insulating material can be an electrically insulating resin of a light-transmitting type (including epoxy and acrylic resins), a semiconductor or a metal oxide. The field effect liquid crystal can be of phase-transition type or ferroelectric type. The entire thickness of the LCD is preferably more than or equal to 1 μm.

A method of manufacturing an LCD achieving the above objectives is generally formed by the following steps:

(a) forming a light-transmitting electrically insulating layer which will not dissolve in a predetermined solvent;

(b) forming a layer of material which can be dissolved by the solvent onto the layer formed in step a;

(c) sequentially repeating steps a and b;

(d) forming a plurality of first holes in the stack of layers formed by steps a to c in a predetermined pattern and filling the first holes with an electrically insulating hardening material;

(e) forming a plurality of second holes in the stack of layers formed by steps b and c in a predetermined pattern and dissolving the material used in step b thereby forming cavities; and (f) filling the cavities with liquid crystal after step e and filling the second holes.

An LCD according to a second embodiment of the present invention (backlight-type LCD) has a color filter which filters light emitted from a backlight source, thereby transmitting predetermined colors into the stacked layers of the LCD. The substrate of the second embodiment transmits light unlike the substrate of the first embodiment. A shielding plate shields the surface of the LCD from direct transmission of backlight.

BRIEF DESCRIPTION OF THE DRAWINGS

Further features and advantages will become more apparent from the following description of the preferred embodiments of the present invention as illustrated in the accompanying drawings in which the same reference characters generally refer to like parts throughout the views, and in which.

DETAILED DESCRIPTION OF THE INVENTION

The desired embodiment of the present invention will be explained in detail with reference to the drawings. Each dimension, material or sequence is suggested as an example only and can be substituted by anything that can realize the technical ideas of the present invention.

Structural Embodiment of a Reflective-type LCD

Figure 1:
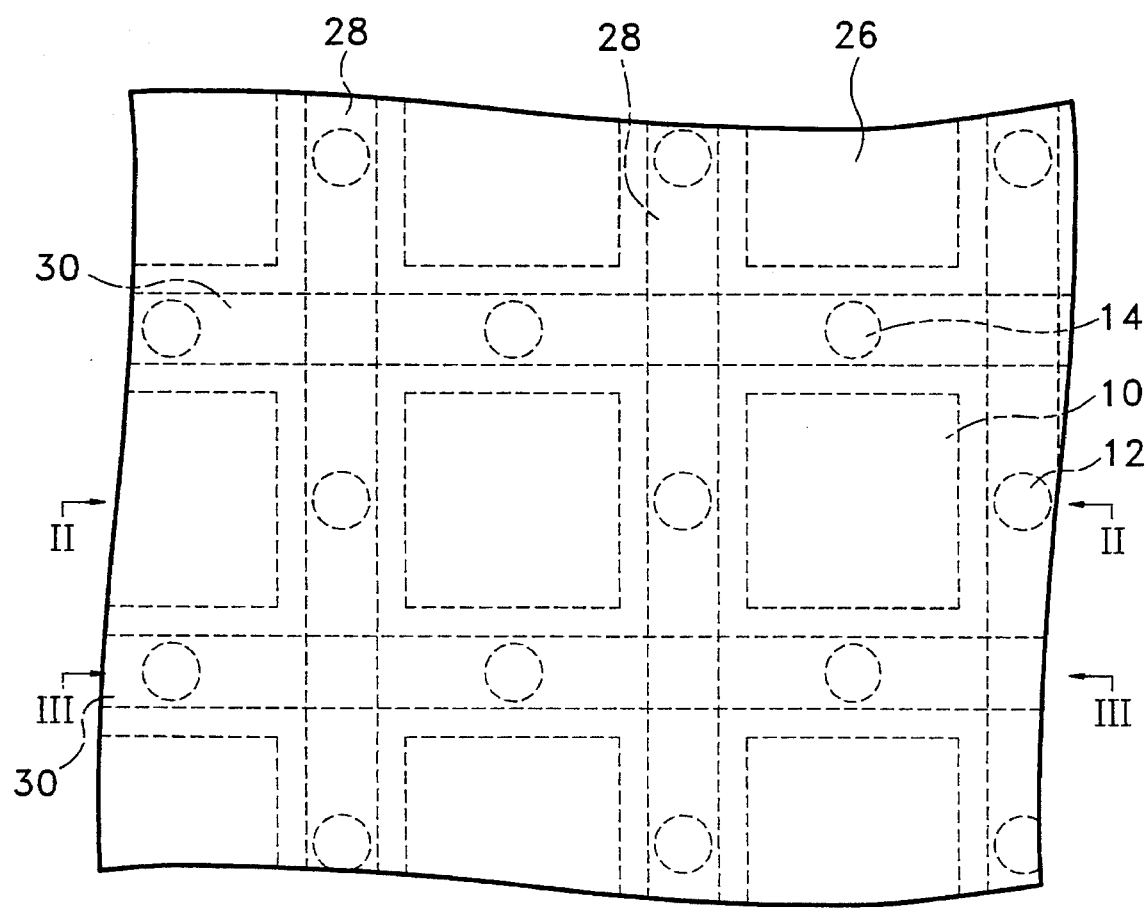
FIG. 1 is a plan view illustrating a reflective-type LCD according to the present invention.
Figure 2:
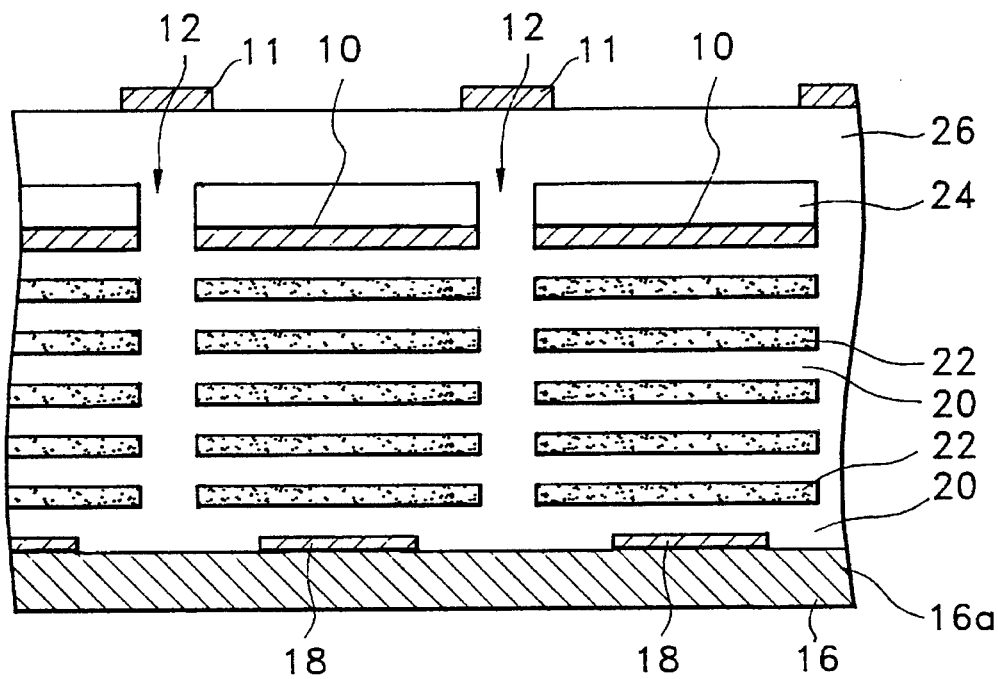
FIG. 2 is a sectional view of the reflective-type LCD shown in FIG. 1 taken along line II—II.
Figure 3:
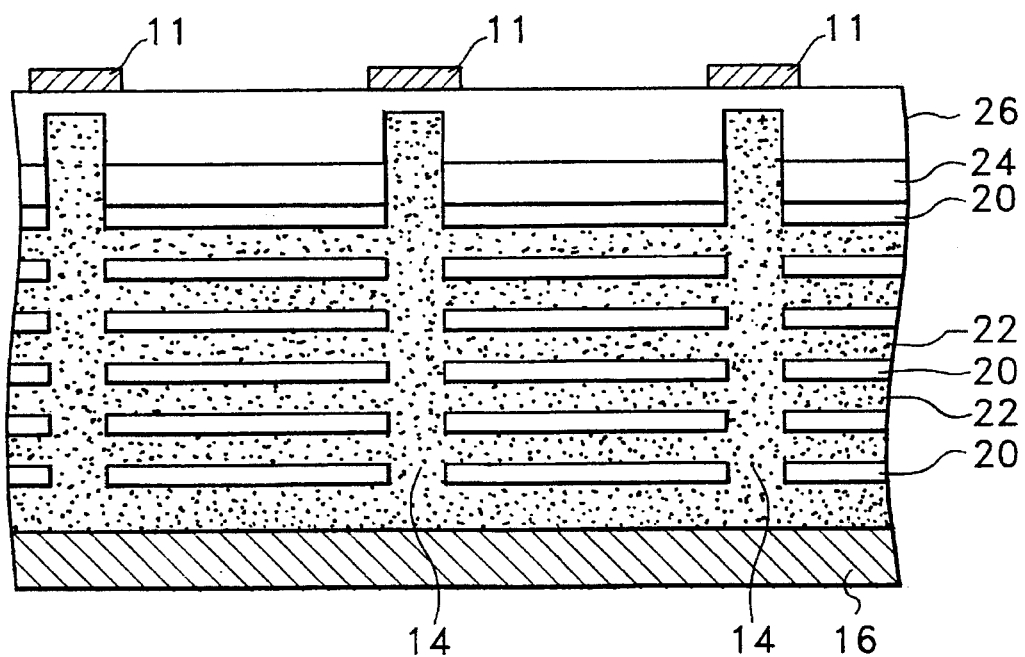
FIG. 3 is a sectional view of the reflective-type LCD shown in FIG. 1 taken along line III—III.

FIG. 1 is a plan view of a reflective-type LCD according to one embodiment of the present invention. Portions of the LCD have been omitted from FIG. 1 but are shown in FIG. 2 and 3 to reduce the complexity of FIG. 1. A plurality of light transmitting electrodes 10 (e.g., made of indium tin oxide "ITO") are formed in an X-Y matrix with a predetermined space between each light transmitting electrode 10. Horizontal signal lines 30 are positioned between column-wise adjacent light-transmitting electrodes 10. Vertical signal line 28 are positioned between row-wise adjacent light-transmitting electrodes 10. Columns 12 formed of light transmitting electrically insulating resin and inlet holes 14 are centrally positioned between adjacent light transmitting electrodes 10. A top layer of light transmitting electrically insulating resin 26 is formed over the entire surface of the LCD.

The vertical and horizontal signal lines 28 and 30 generally form an X-Y matrix. In the case of light-quality televisions, the size of each pixel is approximately 100×300 $\mu$m, and the diameter of each column 12 and inlet hole 14 is approximately 5–10 $\mu$m. Even though the column 12 and inlet hole 14 are formed within the pixel area, the picture quality is not deteriorated due to their presence. The term pixel, as used hereinafter, refers to a single LCD light transmitting electrode 10.

FIG. 2 is a sectional view of the reflective-type LCD shown in FIG. 1 taken along line II—II. Lower electrodes 18 are formed in a predetermined X-Y matrix pattern on a substrate for shielding light 16 (e.g., an epoxy plate) preferably having a black upper face. A stack of preferably at least 5 alternating light transmitting electrically insulating layers 20 and liquid crystal layers 22 are positioned above the lower electrodes 18. The light transmitting electrode 10 is positioned above the top of the stack (the uppermost light transmitting electrically insulating layer 20). A photoresist may be on top of the light transmitting electrode 10 depending upon the techniques used in manufacturing the LCD. Light shielding plates 11 are positioned above the column 12 and on top of the top layer of the light transmitting electrically insulating resin.

Each liquid crystal layer 22 is a field-effective liquid crystal. Nematic-type liquid crystal CNT (cholesteric nematic transition) type using phase transition between nematic and chiral nematic, and FLC (ferroelectric liquid crystal) type are particularly well suited field-effective liquid crystals. The thickness of one liquid crystal layer is desirably less than 3 $\mu$m and more particularly between 500–5000 Å. Also, each light transmitting electrically insulating resin layer 20 is desirably acrylic or epoxy resin with a preferred thickness less than 5 $\mu$m and more particularly between 0.2–2 $\mu$m. In the structure of this embodiment, if light transmitting electrically insulating resin layer 20 and liquid crystal layer 22 are each 2000 Å, the total thickness of a five-story liquid crystal layer is almost 2 $\mu$m. The thinner 5 story liquid crystal does not degrade the quick response time or low driving voltage. Thus, the 5 story liquid crystal is suitable for displaying whiteness with sharp contrast.

FIG. 3 is a sectional view of the reflective-type LCD illustrated in FIG. 1 taken along line III—III. A plurality of light-transmitting electrically insulating resin layers 20 and liquid crystal layers 22 are stacked on the substrate 16 to form five tiers. Photoresist 24 and the top layer of light-transmitting electrically insulating resin 26 are formed in the upper part. Liquid crystal layers 22 are extended to inlet hole 14 which is later sealed by the top light transmitting electrically insulating resin layer 26. Also, to form liquid crystal layers 22, inlet hole 14 is used to dissolve and remove a polyvinyl alcohol (PVA) layer or aluminum layer.

Exemplary Manufacturing Method for a Reflective-type LCD

FIGS. 4 to 9 are plan diagrams sequentially illustrating a process for manufacturing the reflective-type LCD shown in FIGS. 1–3.

Figure 4:
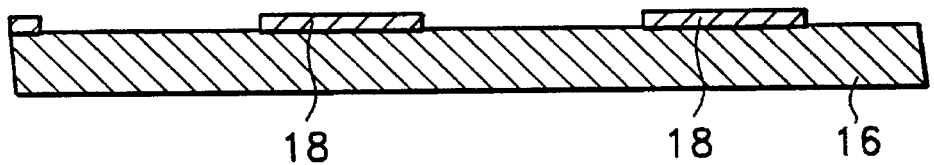
FIGS. 4–9 are sectional views illustrating the respective steps of manufacturing of the LCD shown in FIG. 1.

FIG. 4 illustrates the lower electrode 18 (made of a conductive material) formed on the substrate 16 (for shielding light).

Figure 5:
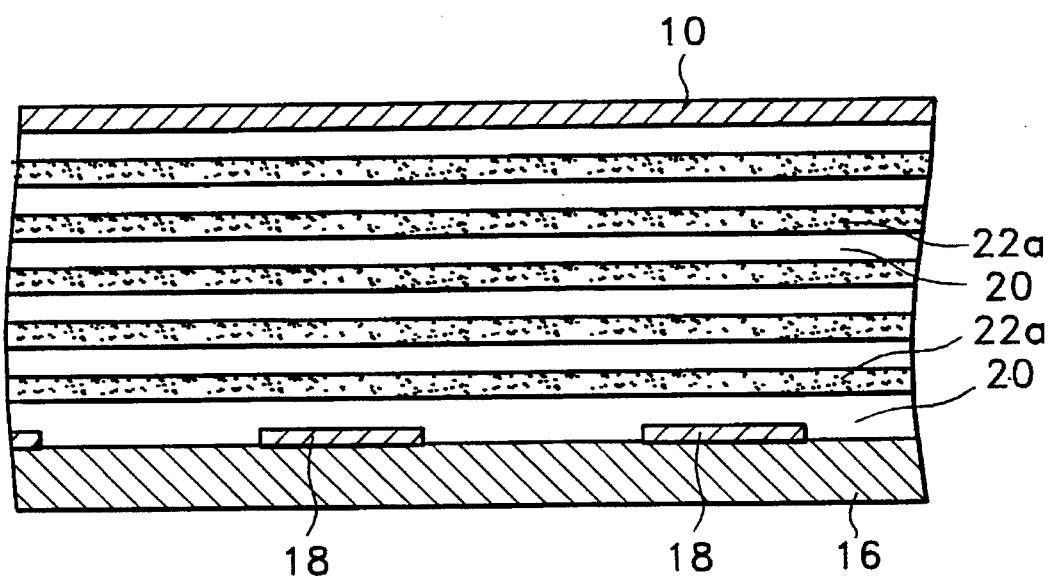
Figure 6:
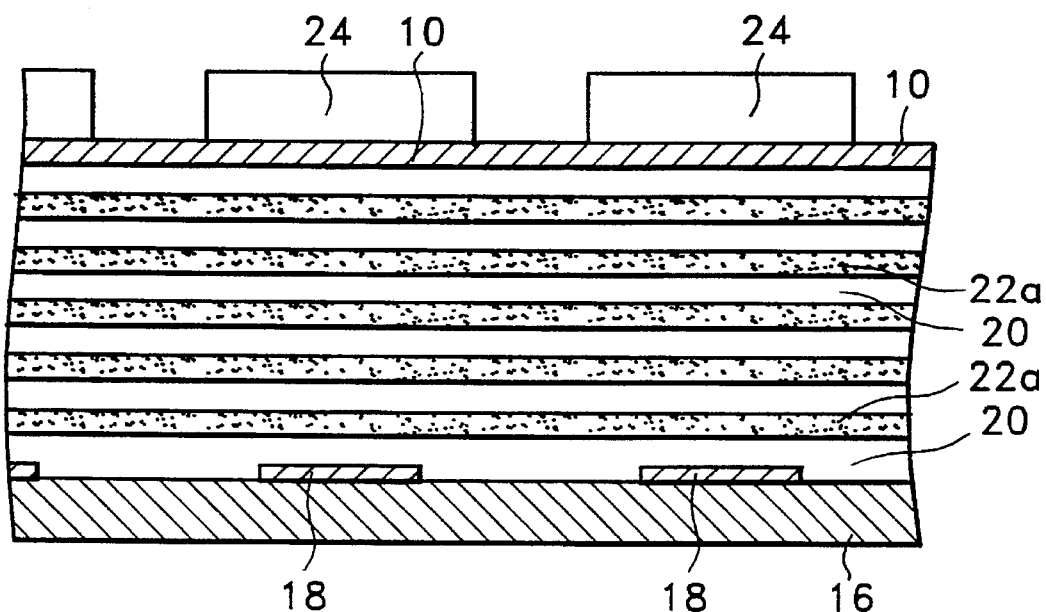

FIG. 5 shows the light transmitting electrically insulating resin layer 20 (e.g., epoxy resin) and a PVA layer 22a are spin coated or roll coated to form five plus alternately stacked layers thereof on the lower electrode 18. In the present embodiment, each layer is 2000 Å. Subsequently, a light transmitting electrode 10 (formed of ITO) is formed on the light transmitting electrically insulating layer 20. A photo mask pattern (not shown) is formed on the resulting structure shown in FIG. 5 for etching, leaving a photoresist 24 (as shown in FIG. 6).

Figure 7:
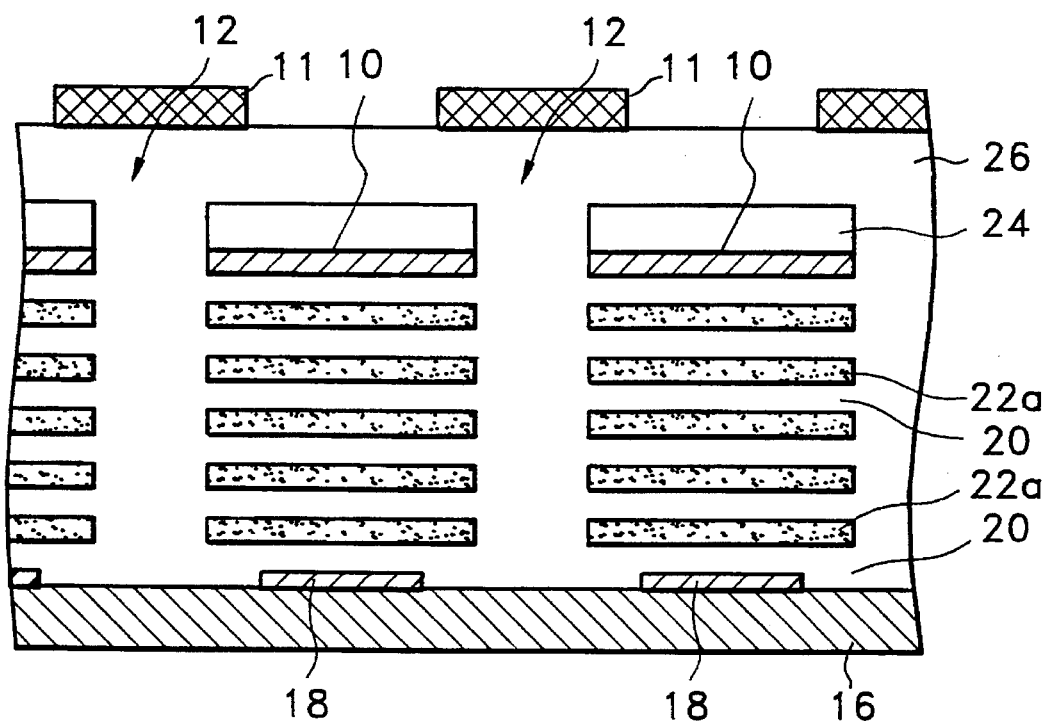

FIG. 7 illustrates plasma etching the portion of the stacked layers not covered by the photoresist 24 to form a hole for column 12. An epoxy resin is coated on the entire surface to form the top layer of light transmitting electrically insulating layer 26, and thus filling the hole to form column 12.

Figure 8:
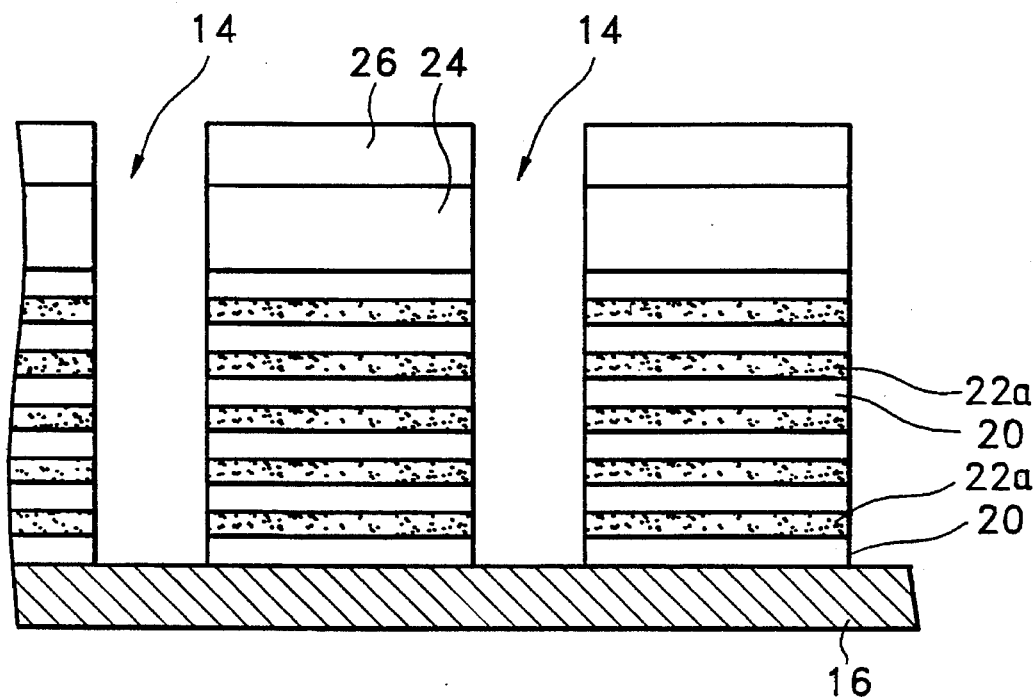

FIG. 8 illustrates forming the inlet hole 14 by photo mask patterning and plasma etching. The PVA layer 22a is dissolved with water, acetone or alcohol, and removed via inlet hole 14. Accordingly, inlet hole 14 and evacuated portion 22b (shown in FIG. 9, which will be later filled with the liquid crystal) are vacated. Each light transmitting electrically insulating layer 20 is supported by column 12 (shown in FIG. 7) to sustain the evacuated portion 22b.

Figure 9:
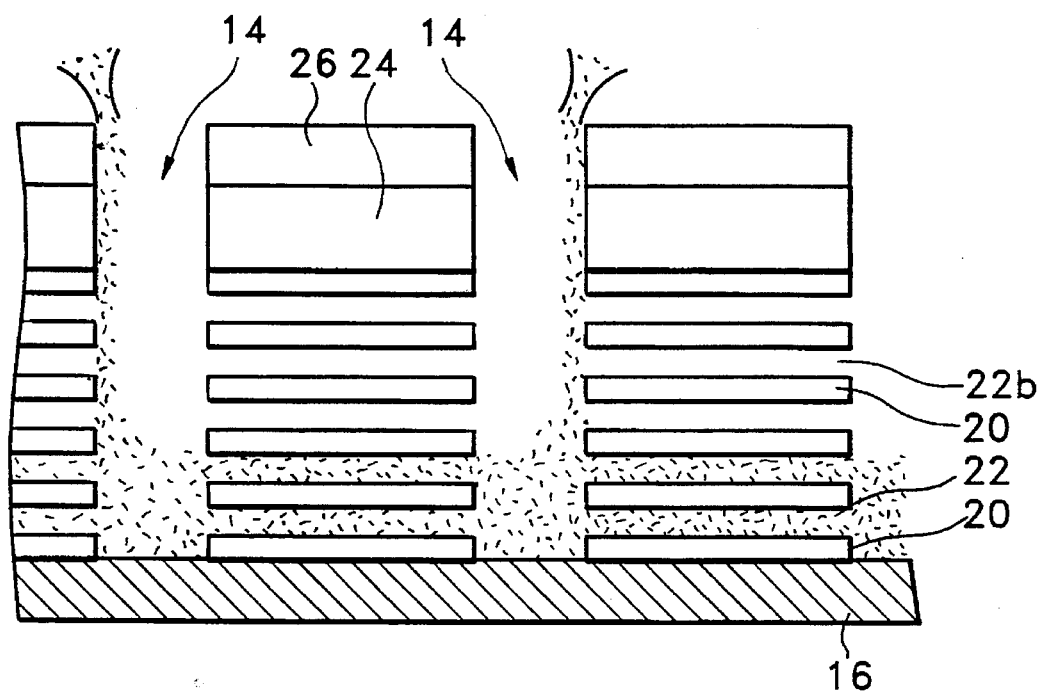

FIG. 9 illustrates the resultant structure after it is dried. Liquid crystal is coated on the entire upper surface thereof under vacuum to fill up inlet hole 14 and evacuated portions 22b after raising the pressure, thereby forming a liquid crystal layer 22. Thereafter, a light transmitting electrically insulating resin is coated on the entire surface to seal the liquid crystal. Shielding plate 11 is formed directly above column 12 and inlet hole 14.

In the above embodiment, epoxy resin is employed as a light-transmitting electrically insulating resin, and PVA is used in the liquid crystal layer portion. However, the materials employed here are not limited to these. For instance, an acryl can be used as the electrically insulating resin. Aluminum can be used in the liquid crystal layer portion. In such a case, the aluminum layer is dissolved and removed by hydrochloric acid instead of acetone. When using PVA, a layer can be formed by spin-coating. When using ultraviolet-type acrylic resin, the lower layer can be exposed. Meanwhile, when using aluminum, owing to its transparency, the etched edges can be seen enabling precise monitoring of the etching process.

An electrically insulating resin is used as the light-transmitting electrically insulating material in this manufacturing embodiment, but a semiconductor or a metal oxide (e.g., $SiO_2$ or $Al_2O_3$) can be used in its place.

In selecting the light-transmitting electrically insulating material and material for the portion for preparing the space to be filled with liquid crystal, every composition is possible as long as the material of the portion to become a liquid crystal layer is extracted by a particular solvent, and the light-transmitting electrically insulating material is not extracted.

Structural Embodiment of a Backlight-type LCD

FIGS. 10 to 13 illustrate an LCD using backlight according to a second embodiment of the present invention.

Figure 10:
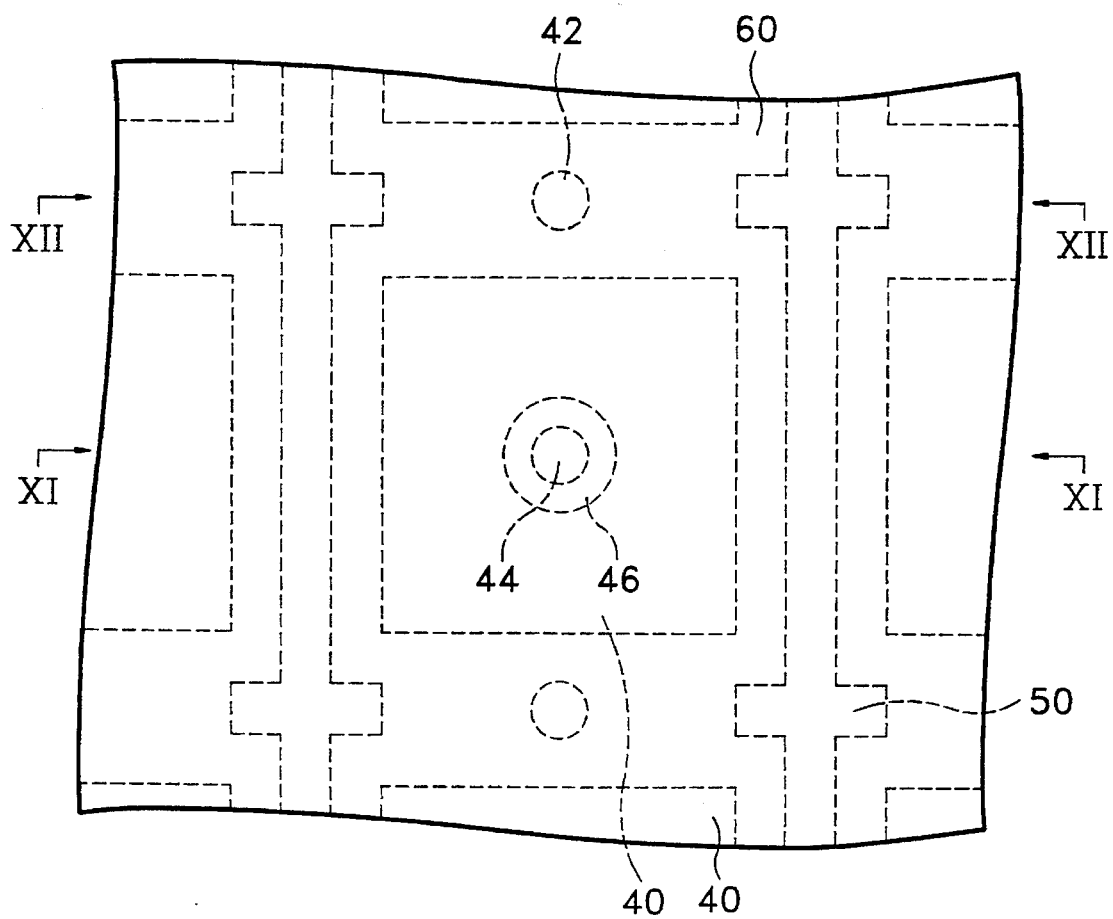
FIG. 10 is a plan view illustrating a backlight-type LCD according to the present invention.

FIG. 10 is a plan view of the backlight-type LCD. In this embodiment, a light-receiving portion is positioned at the center of the pixel. However, a light receiving portion 66 may be placed around the perimeter of the pixel 64 as shown in an embodiment illustrated in FIG. 13 thereby increasing emitted light to sharpen the pixel. The upper layer of a light-transmitting electrically insulating resin 60 is the same as that of the reflective-type. Light transmitting electrode 40 of similar material as the first embodiment are positioned in a predetermined X-Y matrix. However, the light transmitting electrodes 40 are differently shaped. Specifically, a color filter 44, which typically will be one of red, green and blue, as well as the shielding disk disposed above it, are located at the center of each of the light transmitting electrodes 40. Three light transmitting electrodes 40, each having one of a red, green and a blue filter, together operate to transmit the complete color spectrum, as is well known.

The color filter 44 filters and transmits a predetermined color of back light to a stacked liquid crystal. The shielding disk prevents the back light from being directly transmitted such that the light does not pass through the filter. Shielding columns 50 are centrally positioned between columns of the light transmitting electrodes 40. The shielding columns 50 prevent backlight from being transmitted to adjacent stacked liquid crystals. Inlet holes 42 are centrally located between row-wise adjacent light transmitting electrodes 10. An upper layer of light transmitting electrically insulating resin 60 is formed over the entire LCD.

Figure 11:
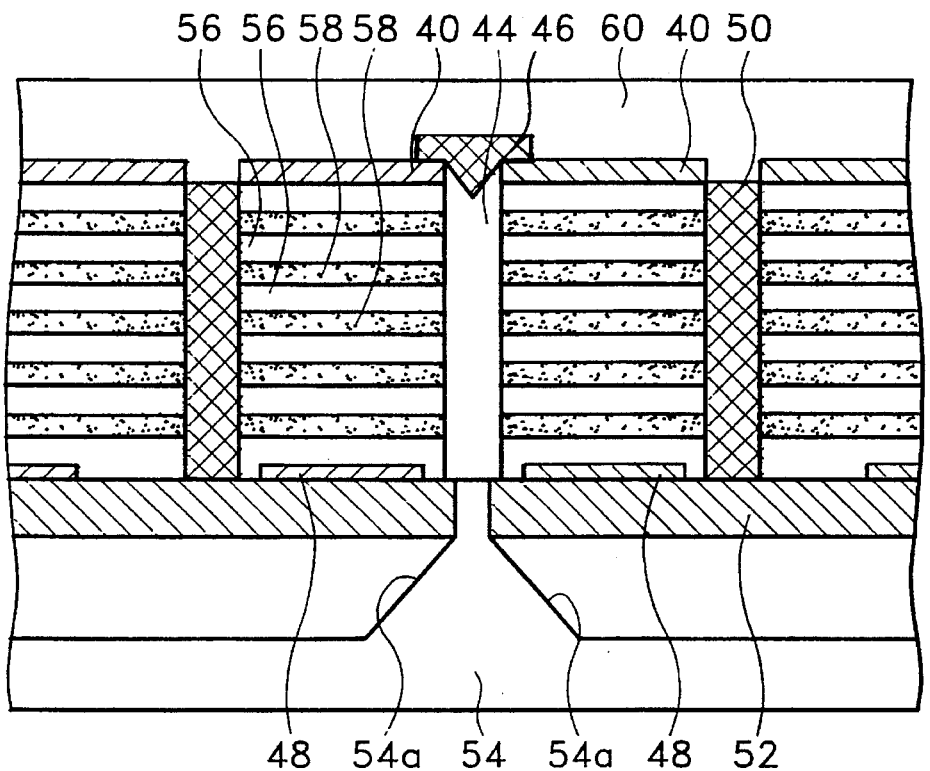
FIG. 11 is a sectional view of the backlight-type LCD shown in FIG. 10 taken along line XI—XI.

FIG. 11 is a sectional view of the backlight-type LCD shown in FIG. 10 taken along line XI—XI. A substrate 54 is made of a light transmitting resin to allow backlight from a light source (not shown) to pass into the backlight type LCD. An aluminum layer is deposited at portion 54a to focus the backlight from the light source on the color filter 44. A shielding layer 52 is positioned above a filler layer 62 to prevent light from entering from the rear of the LCD. The light shielding disk 46 prevents the backlight from being directly transmitted to the upper surface of the LCD. Lower electrodes 48 are positioned on the shielding layer 52. An alternating stack of electrically insulating layers 56 and liquid crystal layers 58 are located above the lower electrodes 48. The light transmitting electrode is positioned above the stack of alternating layers.

The light from the backlight is collected in the color filter 44, so that the light of a desired color is transmitted into the stack of alternating layers (consisting of electrically insulating layers 56 and liquid crystal layers 58) parallel to the surfaces of the stacked layers. If the light radiated by liquid crystal is not scattered, the light transmits into the liquid crystal layer or is absorbed. Meanwhile, if the light is scattered, the scattered light is shown on the viewing surface of the display device to show the light of the desired color.

Figure 12:
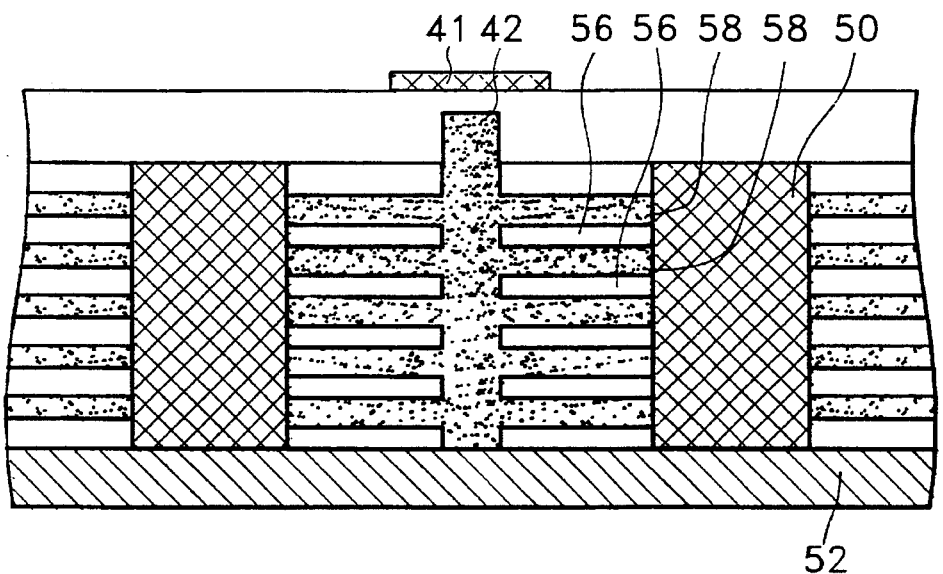
FIG. 12 is a sectional view of the backlight-type LCD shown in FIG. 10 taken along line XII—XII.
Figure 13:
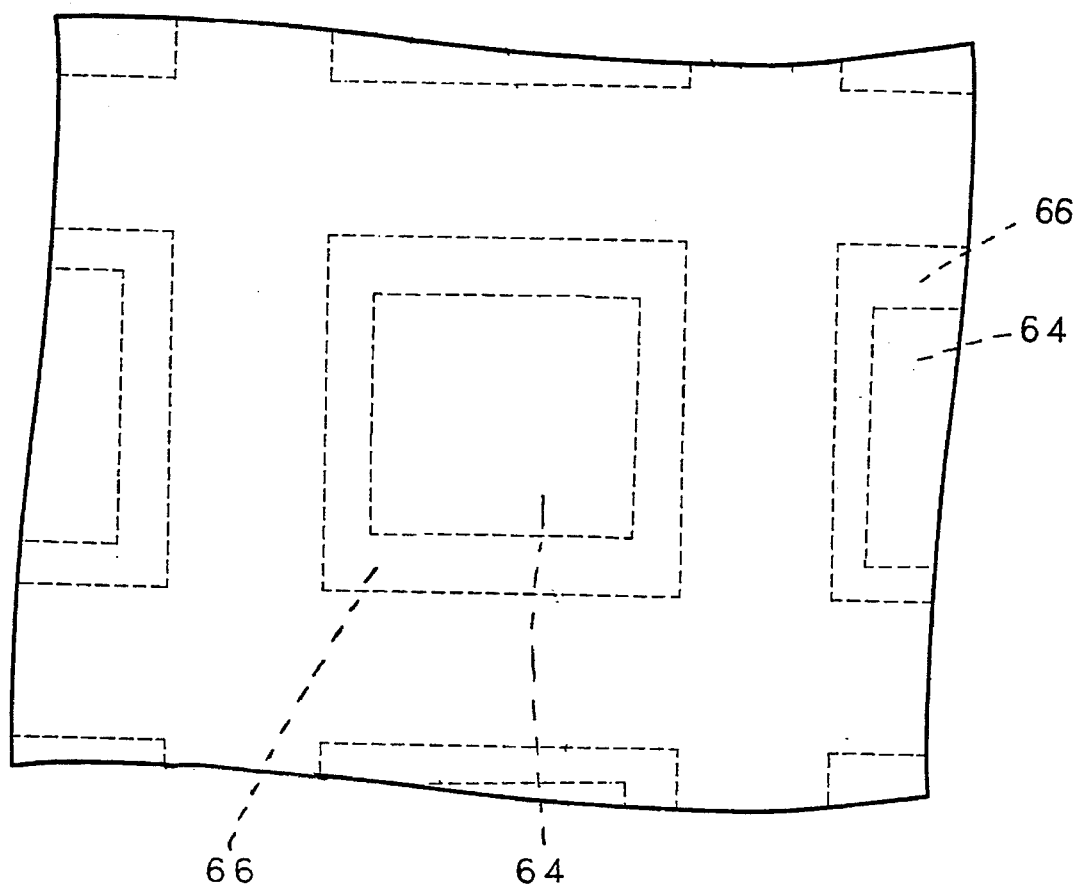
FIG. 13 is a sectional view of a further exemplary embodiment of a backlight-type LCD.

FIG. 12 is a sectional view of the backlight-type LCD shown in FIG. 10 taken along line XII—XII. The light shielding plate 41 is positioned above the inlet hole 42 (which will be sealed with light transmitting resin after liquid crystal is inserted).

The LCD according to the present invention can be applied to informational or ornamental display screens such as large-screen displays, television or computer monitors, and timepiece or calculator displays, when using the memory effect of CNT liquid crystal. According to the present invention, the efficiency of light use in the LCD is increased and, at the same time, white as well as other colors are sharper. Therefore, the LCDs of the present invention can be used in fields where they heretofore could not be used due to the resultant displaying of dim pictures.

The present invention provides an LCD and display apparatus using the same, which exhibit quick response time and sharp contrast due to thin liquid crystal layers, thereby realizing good picture quality. An LCD provides a display apparatus using the same clearly display adequate whiteness density, when adopting the reflective-type LCD of the present invention. In addition, the disclosed backlight-type LCD and display apparatus using the same clearly display adequate color density.

The embodiment of the present invention is explained as above, but the present invention is not limited to this embodiment. That is, within the scope of the technique of the present invention, the dimensions, materials used, the detailed structure and/or manufacturing process can be modified or supplemented.

What is claimed is:

1. A pixel for a liquid crystal display, comprising:

a plurality of light transmitting electrically insulating layers with a predetermined gap between each layer, each said layer having a thickness of at most 5 microns; and means for scattering incident light disposed in said gap between each of said layers, said means for scattering being formed of field-effect liquid crystal.

2. A pixel for a liquid crystal display as in claim 1, wherein there are at least 2 and no more than 4 of said light transmitting electrically insulating layers.

3. A pixel for a liquid crystal display as in claim 1, wherein there are 5 of said light transmitting electrically insulating layers.

4. A pixel for a liquid crystal display as in claim 1, wherein there are greater than 4 of said light transmitting electrically insulating layers.

5. A pixel for a liquid crystal display as in claim 1, wherein said predetermined gap is at most 3 microns.

6. A pixel for a liquid crystal display as in claim 1, wherein each of said plurality of layers is formed from a material selected from the group consisting of a semiconductor, a metal oxide, or a light transmitting type electrically insulating resin including epoxy resin and acrylic resin.

7. A pixel for a liquid crystal display as in claim 1, wherein said scattering means is a material selected from the group consisting of nematic, phase transition or ferroelectric type field effect liquid crystals.

8. A method of manufacturing a pixel for a liquid crystal display, comprising the steps of:

(a) forming a light-transmitting electrically insulating layer which will not dissolve in a predetermined solvent;

(b) forming a layer of material which can be dissolved by said solvent over said light-transmitting electrically insulating layer;

(c) sequentially repeating steps a and b to form a stack of layers;

(d) forming in said stack of layers a plurality of first holes and filling said first holes with an electrically insulating hardening material so that said light-transmitting electrically insulating layers maintain a stable position;

(e) forming a plurality of second holes in said stack of layers and dissolving said material using said predetermined solvent and thereby forming cavities between each light-transmitting electrically insulating layer;

(f) filling said cavities with liquid crystal; and (g) sealing said second holes.

9. A method of manufacturing a pixel for a liquid crystal display as in claim 8 wherein a first bottom light-transmitting electrically insulating layer is formed over a first electrode and a second electrode is formed over a last top light-transmitting electrically insulating layer.

10. A method of manufacturing a pixel for a liquid crystal display as in claim 9 wherein said first electrode is formed on an electrically insulating substrate which shields said LCD pixel from incident light.

11. A pixel for a liquid crystal display, comprising:

a plurality of light transmitting electrically insulating layers with a predetermined gap between each layer;

a field-effect liquid crystal region disposed between each of said layers, thereby creating a stack of layers, for scattering said directed incident light throughout said pixel; and a color filter for directing incident light generally parallel to the insulating layers into said stack of layers.

12. A pixel for a liquid crystal display as in claim 11, wherein said directing means is disposed in substantially a center area of said stack of layers such that said incident light is transmitted from said center area to each of said light transmitting insulating layers and each field effect liquid crystal region.

13. A pixel for a liquid crystal display as in claim 11 having a viewing surface from which the LCD is viewed, wherein said directing means further includes a light shield disposed at said viewing surface for preventing direct backlight from reaching said viewing surface.

14. A pixel for a liquid crystal display as in claim 11 wherein said means for color filtering is one of a red, green and blue filter.

15. A pixel for a liquid crystal display as in claim 11, wherein there are between 2 and 4 inclusive of said light transmitting electrically insulating layers.

16. A pixel for a liquid crystal display as in claim 11, wherein there are 5 of said light transmitting electrically insulating layers.

17. A pixel for a liquid crystal display as in claim 11, wherein there are greater than 5 of said light transmitting electrically insulating layers.

18. A pixel for a liquid crystal display as in claim 11, wherein said predetermined gap is at most 3 microns.

19. A pixel for a liquid crystal display as in claim 11, wherein the thickness of each layer is at most 5 microns.

* * * * *